Dec. 6, 1938. J. A. HASHEK 2,139,267
COOKING VESSEL
Filed Jan. 11, 1937
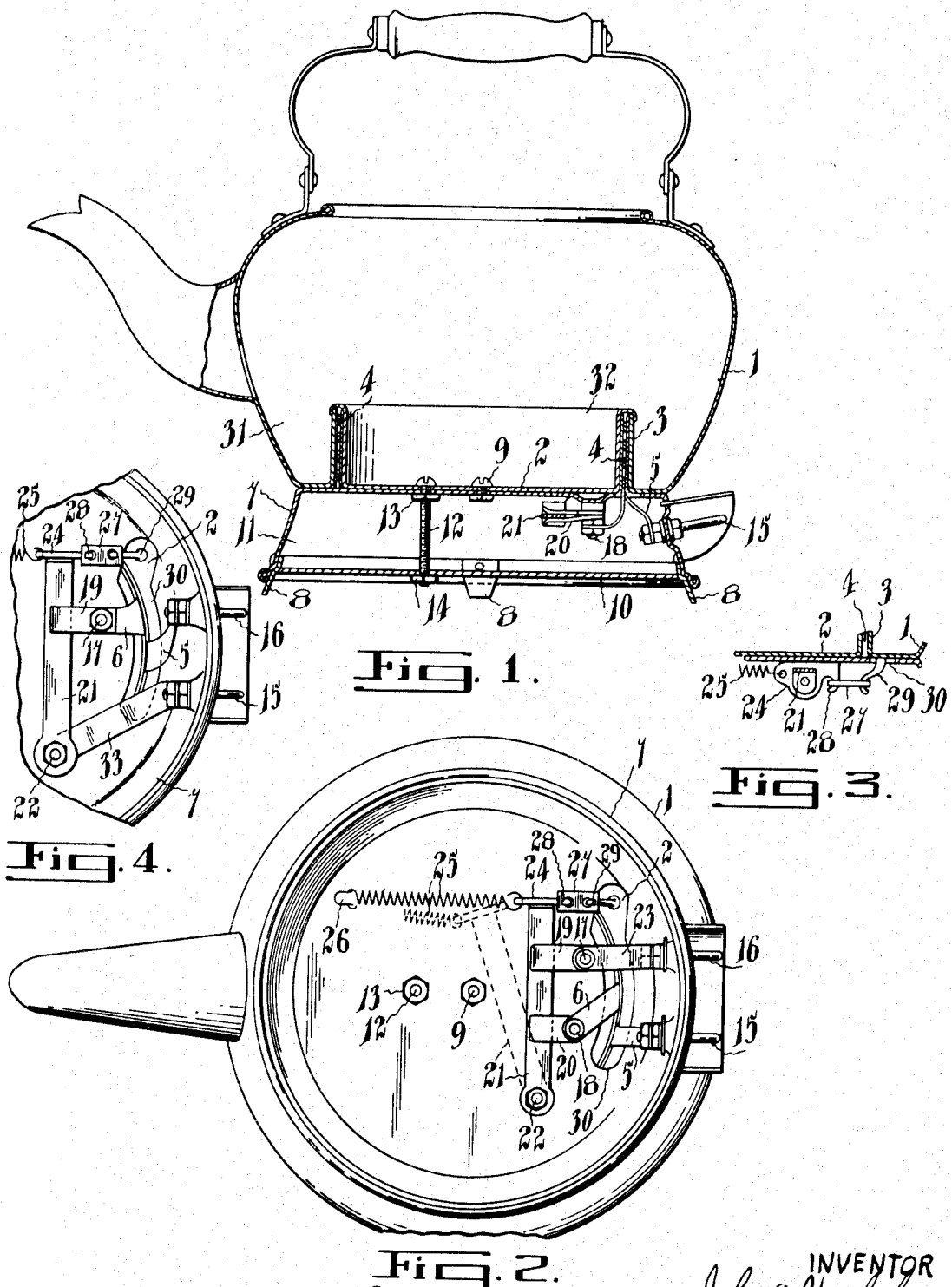

Patented Dec. 6, 1938

2,139,267

UNITED STATES PATENT OFFICE 2,139,267

COOKING VESSEL

John A. Hashek, Toronto, Ontario, Canada, assignor to Jabez Blood, Toronto, Ontario, Canada Application January 11, 1937, Serial No. 119,983
In Canada November 25, 1936

5 Claims. (Cl. 219—44)

This invention relates to kettles or other cooking vessels of the type provided with its own heating means. There is, with this type of cooking vessel, considerable danger of damage in the event that the vessel is not supplied with liquid or in the event of the liquid becoming exhausted. My object is to devise means for automatically cutting off the current to the heating element before any damage can occur to the vessel itself.

I attain my object by providing the cooking vessel with a switch, the movable member of which is held in circuit-closing position by a fusible element located in a position to be fused should overheating occur in the vessel, and by providing means for automatically opening said switch upon the fusing of said fusible element.

The construction is hereinafter more specifically described and illustrated in the accompanying drawing in which—

Fig. 1 is a vertical section of a kettle constructed in accordance with my invention;

Fig. 2 a plan view of the under side of the kettle bottom; and

Fig. 3 a detail in side elevation of the fusible element mounting.

Fig. 4 is a detail plan view of part of the underside of the kettle bottom showing a modified arrangement of the switch.

In the drawing like numerals of reference indicate corresponding parts in the different figures.

1 indicates a cooking vessel, which in the present case is shown as a kettle of which 2 is the bottom. The bottom is shaped to form a hollow annular rib 3 projecting upwardly into the interior of the kettle and open at its underside. In this hollow annular rib is positioned the heating element 4, of which 5 and 6 are the leads. As far as the present invention is concerned, any other type of heating element may be employed for heating the liquid in the vessel.

Secured to the underside of the bottom 2 is a hollow base 7 secured to the bottom 2 by a bolt 9. This base is shown as provided with feet 8. The base is provided with a removable bottom 10 to form a closed chamber 11 in the base. This bottom 10 is held in place by a bolt 12 which is provided with a nut 13 to assist in clamping the base 7 to the bottom 2 and a second nut 14 to hold the removable bottom 10 in place.

Through the side wall of the base 7 project terminals 15 and 16 of usual type to receive an ordinary cord connection.

To the terminal 15 is connected the element lead 5. Depending from the top of the base 7 but insulated therefrom are posts 17 and 18, each of which carry a spring switch blade clip 19—20, which are adapted to receive a blade 21 pivoted on a post 22 also depending from the top of the base 7. The electric circuit is completed by connecting the other element lead to the post 18, while a lead 23 connects the post 17 and the terminal 16.

The blade 21 is provided with an operating member 24 of insulating material. A spring 25 having one end connecting with this member 24 and its other end connected to a lug 26 on the top of the base 7 normally tends to move the switch blade to circuit breaking position as indicated in dotted lines in Fig. 2. This tendency of the spring, however, is resisted by a fusible link 27 having a hole adjacent each end, in one of which is engaged a hook 28 on the member 24, and in the other of which is engaged a hook or arm 29 mounted on the vessel bottom 2 or other stationary part.

In Fig. 4 I show a modified arrangement of switch and electric circuit. The terminal 15 is connected by a bent strip 33 of flat conductor directly to the pivot post 22 on which the blade 21 is pivoted. The post 18 and clip 20 are dispensed with and the circuit is completed by connecting one element lead 6 to the post 17, which carries the blade engaging clip 19, while the other element lead is connected to the terminal 16. The strip 33 and also the blade 21 are provided with enlarged bearing portions as shown to insure a good electrical connection.

It will be noted from Fig. 1 of the drawing that when the water level falls below the upper edge of the heating element casing two distinct bodies of water are formed, the heating element casing forming the partition therebetween. For a purpose which will hereinafter appear, it is very desirable that one of these compartments hold a greater quantity of liquid than the other. In the drawing the compartment 32 within the heating element is shown as of greater capacity than the surrounding compartment 31, and the post 29 which carries one end of the fusible link 27 is attached directly to the bottom of the compartment of lesser capacity.

The operation of the apparatus is as follows. As long as both compartments of the vessel contain sufficient liquid there will not be sufficient heat in the chamber 7 to cause fusing of the link 27. Should the liquid level fall below the top of the heating element, the liquid is divided into two parts. There being less liquid in the compartment 31 than in the compartment 32, the liquid in the compartment 31 will be evaporated more quickly than that in the compartment 32. As soon as the liquid in the compartment 31 is evaporated the bottom thereof will become highly heated, which heat is transmitted to the post 29 which is secured directly thereto, and causes the fusing of the link 27 to allow the switch to open to break the circuit. It will be noted that during this over-heating of the bottom of the compartment 31 there is still liquid in the compartment 32 and this liquid is sufficient to prevent the kettle as a whole from becoming too highly heated, and therefore the danger of damaging the kettle is eliminated. It will be noted that the top of the base is cut away as indicated at 30 for the passage of the leads 5 and 6 and this opening is made sufficiently large to permit the attachment of the post 29 directly to the bottom of the smaller liquid compartment.

It will be noted that the fusing of the link 27 is caused by excessive temperature conditions within the base 7 and not by line conditions.

In the event of fusing of the link, it is a simple matter to remove the bottom cover 10 and substitute a fresh link.

From the above description it will be seen that I have devised protective means which will accomplish the object of my invention as set out in the preamble of this specification.

What I claim as my invention:

1. A cooking vessel having a liquid receiving chamber; a partition extending upwardly from the bottom of said chamber dividing the lower portion into two compartments, one of which is smaller than the other; electric heating means in said partition for simultaneously heating said compartments; and means for automatically cutting off said heating means when said smaller compartment becomes dry.

2. A cooking vessel having a liquid receiving chamber; a partition extending upwardly from the bottom of said chamber dividing the lower portion into two compartments one of which is smaller than the other; electric heating means in said partition for simultaneously heating said compartments; a switch controlling said heating means; means normally tending to open the switch; a post secured to the bottom of the compartment of smaller capacity; and a fusible link connected at one end to said post and at the other end to the switch for retaining said switch closed.

3. A cooking vessel having a liquid receiving chamber, the bottom of said chamber being bent upwardly to form a hollow partition, open to the under side of said bottom; electric heating means in said partition; a base secured to the bottom of the chamber, said base being formed as a housing having a closed top forming a closure for the greater part of the length of said partition; a switch in said housing controlling the heating means; means normally tending to open the switch; a post secured to the bottom of the chamber at one side of said partition, the top of the base having an opening therein through which said post projects, and a fusible link in said housing connected at one end to said post and at the other end to the switch for retaining said switch closed.

4. A cooking vessel having a liquid receiving chamber, the bottom of said chamber being bent upwardly to form a hollow partition dividing the lower portion into two compartments, said partition being open to the under side of said bottom; electric heating means in said partition; a base secured to the bottom of the chamber, said base being formed as a housing having a closed top forming a closure for the greater part of the length of said partition; a switch in said housing controlling the heating means; means normally tending to open the switch; a post secured to the bottom of the compartment of smaller capacity, the top of the base having an opening therein through which said post projects, and a fusible link in said housing connected at one end to said post and at the other end to the switch for retaining said switch closed.

5. A cooking vessel having a liquid receiving chamber, the bottom of said chamber being bent upwardly to form a hollow partition, open to the under side of said bottom; electric heating means in said partition; a base secured to the bottom of the chamber, said base being formed as a housing having a closed top forming a closure for the greater part of the length of said partition; a switch in said housing controlling the heating means; means normally tending to open the switch; a post secured to the bottom of the chamber at one side of said partition, the top of the base having an opening therein through which said post projects, and a fusible link in said housing connected at one end to said post and at the other end to the switch for retaining said switch closed, said housing having a detachable bottom.

JOHN A. HASHEK.